(12) United States Patent
Pine et al.

(10) Patent No.: US 9,302,240 B2
(45) Date of Patent: Apr. 5, 2016

(54) LOCK AND KEY COLLOIDS AND METHODS OF MANUFACTURE

(71) Applicant: New York University, New York, NY (US)

(72) Inventors: David J. Pine, New York, NY (US); Paul Michael Chaikin, New York, NY (US); Stefano Sacanna, New York, NY (US); William Irvine, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 14/451,160

(22) Filed: Aug. 4, 2014

(65) Prior Publication Data
US 2014/0343181 A1 Nov. 20, 2014

Related U.S. Application Data

(63) Continuation of application No. 13/559,432, filed as application No. PCT/US2011/022990 on Jan. 28, 2011, now Pat. No. 8,815,118.

(60) Provisional application No. 61/299,641, filed on Jan. 29, 2010.

(51) Int. Cl.
*C08L 25/06* (2006.01)
*B01J 13/00* (2006.01)
*C08L 33/14* (2006.01)

(52) U.S. Cl.
CPC ............. *B01J 13/0021* (2013.01); *C08L 25/06* (2013.01); *C08L 33/14* (2013.01)

(58) Field of Classification Search
None
See application file for complete search history.

(56) References Cited

U.S. PATENT DOCUMENTS

| | | | | |
|---|---|---|---|---|
| 4,753,035 | A * | 6/1988 | Ryan et al. | 47/57.6 |
| 5,156,706 | A * | 10/1992 | Sephton | 159/47.1 |
| 6,507,989 | B1 | 1/2003 | Bowden et al. | |
| 7,695,814 | B2 * | 4/2010 | Gartstein et al. | 428/407 |
| 8,071,685 | B2 * | 12/2011 | Nosker et al. | 525/221 |
| 8,815,118 | B2 | 8/2014 | Pine et al. | |
| 2005/0250856 | A1 | 11/2005 | Maskaly et al. | |
| 2006/0159938 | A1 * | 7/2006 | Lee et al. | 428/447 |
| 2008/0234394 | A1 * | 9/2008 | Hong et al. | 516/22 |
| 2009/0324904 | A1 | 12/2009 | Mason | |

(Continued)

FOREIGN PATENT DOCUMENTS

WO WO-2008/076414 6/2008

OTHER PUBLICATIONS

Lu et al. "Preparation and characterization of micron-sized hollow polysiloxane spheres" Chemical Engineerinc Science, 2007, 62, 4880-4884.*

(Continued)

*Primary Examiner* — Robert S Loewe
(74) *Attorney, Agent, or Firm* — Foley & Lardner LLP

(57) ABSTRACT

A method and system for assembling building blocks of colloidal particles and also for shaping of colloids for self-assembly for manufacturing, processing and formation of compositions of matter. A first type of particle is selected as a "key" particle constructed to mate with a "lock" particle, the binding arising from depletion forces. A variety of shapes can be used to carry out this method and system to create compositions of matter. Colloids can be shaped by controlled deformation of multiphase colloid particles.

16 Claims, 18 Drawing Sheets

(56) References Cited

U.S. PATENT DOCUMENTS

2010/0092393 A1* 4/2010 Haghgooie et al. ............ 424/9.6
2010/0233436 A1* 9/2010 Mason et al. ................. 428/156

OTHER PUBLICATIONS

Yu et al. "The Combination of Colloid-Controlled Heterogeneous Nucleation and Polymer-Controlled Crystallization: Facile Synthesis of Separated, Uniform High-Aspect-Ratio Single-Crystalline BaCrO4 Nanofibers" Adv. Mater. 2003, 13, 133-136.*
Zoldesi et al. "Deformable Hollow Hybrid Silica/Siloxane Colloidds by Emulsion Templating" Langmuir 2006, 22, 4343-4352.*
Bishop, et al. "Nanoscale Forces and Their Uses in Self-Assembly", Small (2009) p. 1600-1630, vol. 5, No. 14, Wiley InterScience.
Written Opinion of the ISA for PCT/US2011/022990, dated Jul. 2011.
Office Action for U.S. Appl. No. 13/559,432, dated Jan. 16, 2014, 6 pages.
Notice of Allowance for U.S. Appl. No. 13/559,432, dated Apr. 25, 2014, 5 pages.
Hernandez et al., Colloidal Alphabet Soup: Monodisperse Dispersions of Shape-Designed LithioParticles J. Phys. Chem. C, 2007, 111, 4477-4480.
Sacanna et al., "Lock and Key Colloids", Nature, 2010, 575-578.

* cited by examiner

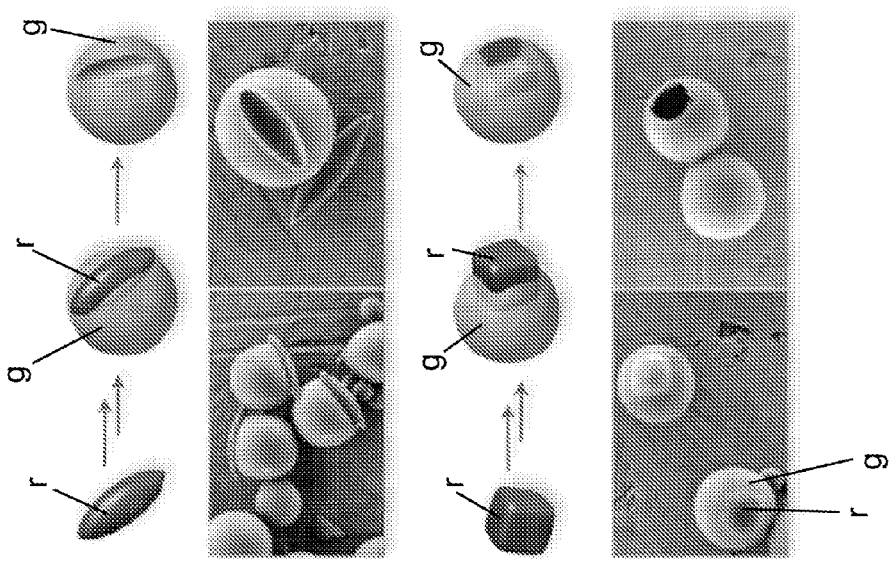
FIG. 6C
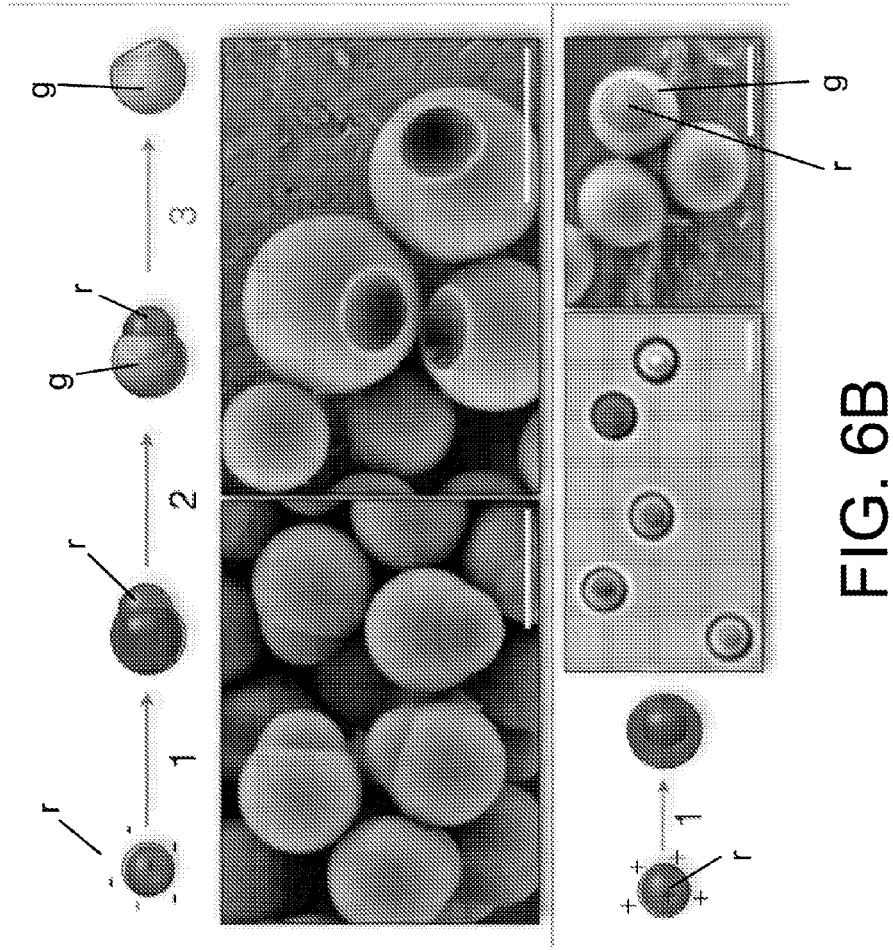
FIG. 6A
FIG. 6B

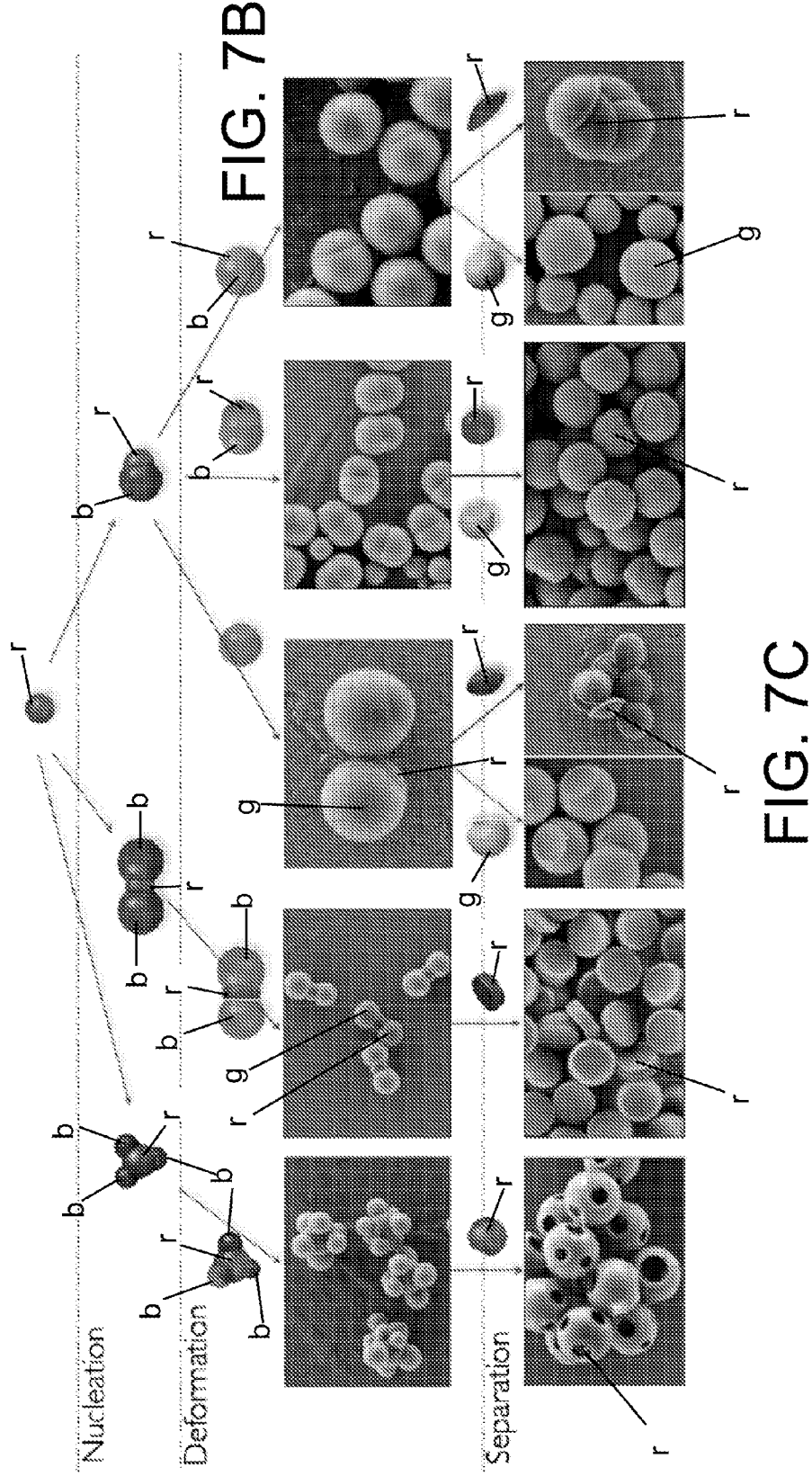

FIG. 8A(1)
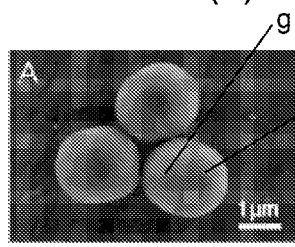
FIG. 8A(2)
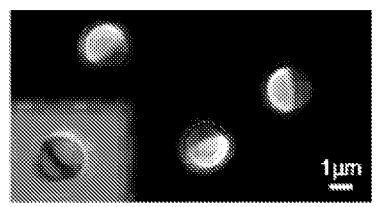
FIG. 8B(1)
FIG. 8B(2)
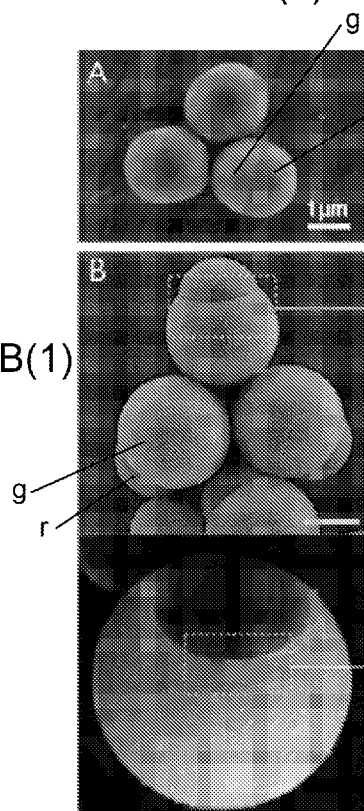
FIG. 8C(1)
FIG. 8C(2)

LOCK AND KEY COLLOIDS AND METHODS OF MANUFACTURE

CROSS-REFERENCE TO RELATED APPLICATIONS

This application is a continuation of Ser. No. 13/559,432, filed Jul. 26, 2012, which is a continuation-in-part of International Application No. PCT/US2011/022990, filed Jan. 28, 2011, which claims priority from U.S. Provisional Application No. 61/299,641, filed Jan. 29, 2010, all of which are incorporated herein by reference in their entirety.

STATEMENT REGARDING FEDERALLY SPONSORED RESEARCH

This work was supported in part by NSF Grant DMR-0706453 and MURI grant W911NF-10-1-0158 and certain rights therein reside with the U.S. government.

FIELD OF THE INVENTION

The invention is directed to a method and system for providing colloidal particles that can be programmed to recognize and bind specifically to each other to provide a means for directing self assembly and for creating new materials from these colloidal building blocks. In addition, the invention is directed to a method and system for shaping of colloids for self-assembly, including monodispersed and ultra bright fluorescent spherical particles in whole colloidal size ranges. In addition, fabricated colloidal particles can be transferred from water to organic solvents without losing their stability.

BACKGROUND OF THE INVENTION

It has been a strategic objective in the bioscience area, as well as others areas of technology, to develop methods and systems for assembly methodologies to create arrangements of particles having desired species attached thereto, such as for example an attachment of DNA to nanometer and micrometer size particles. Further, the creation of a new material often starts from the design of its constituent building blocks at a smaller scale. From macromolecules to colloidal architectures, to granular systems, the interactions between basic units of matter can dictate the macroscopic behavior of the resulting engineered material and even regulate its genesis. Information can be imparted to the building units by altering their physical and chemical properties. In particular, the shape of building blocks plays a fundamental role at the colloidal scale, as it can govern the self-organization of particles into hierarchical structures and ultimately into the desired material. However, conventional methods have not been able to achieve the desired goals; and therefore a substantial need exists to formulate an efficient, as well as effective, method and system for achieving precise assembly techniques, in particular self-assembly methods and systems and also the ability to shape colloids for self-assembly.

SUMMARY OF THE INVENTION

The present invention concerns in one aspect an alternative recognition methodology for particle manipulation and particle assembly mechanisms. These mechanisms rely on the complementary shapes of the particles involved: for example, colloidal spheres can be "keys" as one component building block and monodisperse colloidal particles with spherical cavities can be "locks" as the second component mating with the "keys." Using these two complementary building blocks, we observe the spontaneous formation of composite lock and key structures whose reversible specific assembly is mediated by a depletion interaction and controlled by how closely the size of a spherical colloidal key particle matches the radius of the spherical cavity of the lock particle. The resulting assemblies have the unique feature of flexible bonds, and also have reversible binding features. Developing this methodology of assembly can be accomplished with flexible dimeric, trimeric and tetrameric colloidal molecules as well as more complex colloidal polymers. The strength of the specific binding can be tuned by changing the depletant size using controlled temperatures and by changing the strength of the screened Coulomb interaction between particles. This simple interparticle recognition mechanism provides a new class of "flexible" colloidal microstructures, which does not require materials from biology or other external sources, and provides a new artificial methodology to program and direct colloidal self-assembly. In another aspect of the invention a simple and general approach is provided to generate an entire collection of new type of anisotropic colloids. This method is based on a controlled deformation of multiphase colloidal particles that can be selectively liquified, polymerized, dissolved and functionalized in bulk. This particular method embodiment includes the preparation of monodispersed and ultra bright fluorescent spherical particles in whole colloidal size range. The fabrication method is water-based and therefore cheap and easily scalable. Fabricated colloidal particles can also be transferred in organic solvents, including mixtures having the same refractive index and density of the particles themselves. This is a highly desirable feature as it enables the preparation of concentrated particle's suspensions that are optically transparent and do not sediment by gravity. In yet another embodiment, the lock and key components can be coupled to other articles to act as patches for coupling both the lock and key, as well as articles coupled thereto. This enables extending the lock and key components to construct an even wider variety of articles of manufacture. In further embodiments various methods can be used to construct such lock and key colloids, for example, by use of polymerized oil droplets, with seeds disposed therein. Polymerization of the oil droplets creates a particle having a protrusion. The colloids can be further processed to selectively dissolve the seeds (of various shapes) and obtain particles with well defined cavities in the various shaped seeds. In other embodiments particles can be functionalized by use of chemical reactivity of materials, such as compartmentalized polymers or use of a polymer as a sacrificial protective layer, acting as a mask against reaction. This methodology allows tailoring of surface functionalities and forming additional functional patches on the base lock and key colloids, as well as enabling use for coupling to other components, as described before. Self assembly can also be controlled and reversed by use of depletion interaction and actuation of mechanisms or processes by employing magnetic fields, electrical fields, electromagnetic energy and acoustic energy, for example.

BRIEF DESCRIPTION OF THE FIGURES

FIG. 5 (section "b") shows the flexibility of lock-key bonds in various assemblies, which are confined to two dimensions by sitting on a glass microscope slide. (Scale bars, are 2 μm);

FIG. 6A shows a schematic diagram of the synthetic steps involved in the preparation of particles with various types of protrusions and cavities; spherical PS seeds can be encapsulated into polymerized oil droplets via a seeded dispersion polymerization (step 1); depending on the PS surface charge, the seeds can sit at the oil-water interface (negatively charged seeds, see FIG. 6A) or be entirely engulfed in the oil (positively charged seeds; see FIG. 6B) the oil is then polymerized (step 2) to obtain particles with a protrusion; these colloids can be further processed to selectively dissolve the original seeds and obtain particles with well defined cavities (step 3); see FIG. 6C; this scheme is applied to differently shaped seeds such as ellipsoids and cubes; false-color SEM images highlights the seeds denoted "r" and the polymerized oil denoted "g"; a bright field microscopy image of unpolymerized composite particles is also shown in FIG. 6B. Scale bars are 2 μm;

FIG. 7A shows a nucleation step and depending on the experimental conditions, the oil can nucleate on the seeds forming a single lobe, two opposite lobes or multiple lobes; FIG. 7B shows a deformation step: the addition of toluene causes the PS seeds to liquify and whole particles to deform under surface tension forces; and FIG. 7C shows a separation step: after polymerization the newly shaped particles are comprised of two compartmentalized polymers: PS and polymerized TPM, each polymer can be selectively dissolved, effectively allowing us to split the composite particle into complementary pieces;

FIGS. 8A-C show functionalizing particles by either the different chemical reactivity of PS and TPM or use of one polymer as a sacrificial protective layer; in FIG. 8A(1) and 8A(2) are shown Janus-like colloids fabricated in bulk by trapping and locking dye molecules into the PS phase via a two steps swelling and polymerization process; in FIG. 8B(1) and 8B(2) are shown the steps involved in the synthesis of colloids with a partially coated surface; first gold nano particles are homogeneously adsorbed onto a composite particle and then the one part of the particle is selectively dissolved to reveal an uncoated surface; FIGS. 8C(1) and 8C(2) are shown magnified one of colloids with an open receptacle and gold particles disposed on the particle surface. (Scale bars are 1 μm);

in FIG. 9A step A, bowl-like particles are stacked up into flexible worm-like structures in FIG. 9B step B, clusters are assembled from spheres fitting into dimpled particles and in FIG. 9C step C, disks are forming stiff columnar aggregates; and FIG. 10A(1) shows creation of colloidal particles with tailored surface functionalities or patches; our bi-material colloids (labeled "g" and "r") in FIG. 10A(1) with nano particles (here magnetite, $Fe_3O_4$) in FIGS. 10A(2), 10B(1) and 10B(2) and then selectively dissolved in one part of the composite particle using an appropriate solvent (in this example PS was dissolved by toluene)

DETAILED DESCRIPTION OF PREFERRED EMBODIMENTS

Figure 1A:
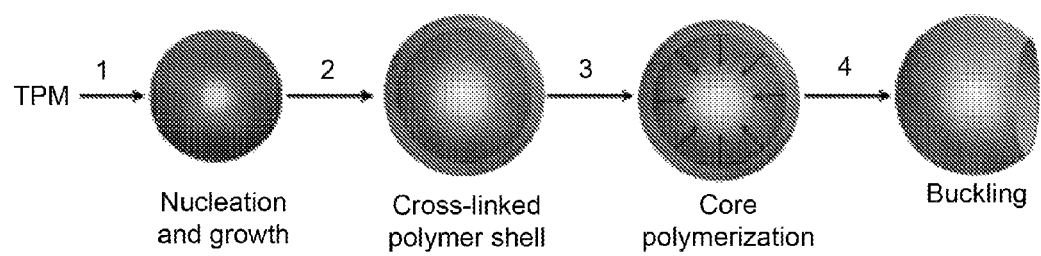
FIG. 1A is a schematic diagram showing the synthetic steps involved in the preparation of particles with well-defined spherical cavities; monodisperse silicon oil droplets are in step (1) nucleated from an homogeneous solution of hydrolyzed 3-Methacryloxypropyl trimethoxysilane monomer, and in step (2) encapsulated into cross-linked polymer shells. The liquid core in step (3) contracts when polymerized and in step (4) drives a controlled shells buckling mechanism that forms spherical cavities.

In one aspect of the invention two components, or building blocks, are used: "key" particles and "lock" particles. These building blocks utilize geometric and depletion interaction to carry out self assembly, which may be useful for manufacturing and/or processing of components as part of a larger purpose. In addition, these building blocks can be used as "patches" to couple to other components or units to enable assembly of these coupled units to construct other types of articles with selectable properties.

It is therefore possible to form particle assemblages of colloidal particles and other components (as described above) that have complementary shapes such that one colloidal particle can fit into another. An example would be two particles, one a sphere, serving as the "key" particle, and the other a sphere with a partially spherical cavity (e.g., a hemispherical cavity), serving as the "lock" particle, that the other (spherical) particle could fit into. Other shapes could be used as well. For example, cubic cavities in spherical lock particles and complementary cubic key particles can be made.

Depletion interactions can bring the complementary particles together. Dissolved polymers, polymer gel particles, or virtually any other colloid of an appropriate size can be used as the "depletant" that creates a "depletion attraction" between the colloidal particles, including the lock particles and the key particles. By proper adjustment of the concentration and size of the depletant, the strength of the depletion interaction can be adjusted so that only lock-and-key pairs bind and they bind only at the lock-and-key site. i.e. at the recess.

In one embodiment, the depletion interaction can be tuned using depletant particles (e.g., poly-NIPAM) whose size can be changed by changing temperature. Changing the depletant particle size with temperature allows the depletion attraction to the turned on and off by changing temperature. Thus, the lock-and-key interaction between complementary lock-and-key pairs can be turned on and off by changing the temperature. A similar change in depletant size could be effected by changing the chemical composition of the solvent, for example, by changing pH. Thus, changing the temperature or chemical composition of the environment can control lock-and-key binding. In another application, electromagnetic energy and even acoustic energy can be applied to control depletion interaction and other mechanisms activated by use of such energy sources.

In one embodiment, paramagnetic nanoparticles can be used as the depletant. Nonmagnetic Lock and Key particles can be added to a suspension of nanometer-sized paramagnetic colloids (also known as a ferrofluid) to obtain an "inverse ferrofluid". In such a mixture the magnetic nanoparticles can act as a regular depletant bringing the complementary lock and key colloids together. Furthermore, because the nonmagnetic particles are much larger than the magnetic nano-colloids, the ferrofluid acts as a continuous, magnetizable medium. In a magnetized ferrofluid the non magnetic particles form "magnetic holes" and develop an effective dipole moment opposite to the applied field. Its magnitude is proportional to the size of the non magnetic particle and the magnetization of the surrounding ferrofluid. This enables nonmagnetic lock and key colloids to interact via a dipole-dipole potential generated by the external magnetic field. Significant higher-order interactions, such as magnetic quadrupole interactions, are also possible for more complex-shaped lock-and-key combinations, for example, when three locks attach to a single key particle. In such a colloidal system a simultaneous and independent control of depletion and dipole-dipole interactions can be realized by tuning, respectively, the ferrofluid concentration and the magnitude of the external magnetic field. This could produce novel switchable magnetic suspensions, with uses as magneto-rheological fluids where the viscosity and other rheological properties of the suspension are controlled by an externally applied magnetic field. In one embodiment, the nanoparticle paramagnetic colloids comprise $Fe_3O_4$ colloids in the size range 1 to 20 nm. It should be appreciated that the threshold where the magnetic force dominates, and thus enables assembly as described in the above embodiment, depends on the concentration of ferrofluid and other such factors. Thus, a wide range of magnetic field strengths can be used as needed.

It one embodiment, the lock and key particle binding may be fixed such that removal of the depletant (and the depletion interaction) does not cause the binding between the lock and key particle to break. For example, addition of an absorbing polymer or a salt to the composition may, in certain embodiments, cause the lock particle and key particle binding to become irreversible. In such embodiments, the depletant may be removed from the composition.

An important feature of lock-and-key binding is that it is specific. That is, if the shapes and/or sizes of the lock and key particles are not sufficiently well matched, binding does not occur or does not occur with an appreciable frequency. Thus, lock and key particles can be designed so that one set of key particles A fit into one set of lock particles A' while another set of key particles B fit into another set of lock particles B', but no A-B bound pairs (including primes) can form.

The bond between the lock particle and the key particle is flexible, in one embodiment. Thus, lock and key particles can be used to make colloidal aggregates whose shape is flexible. For example, if two locks with spherical cavities bind to a single spherical key, a flexible ball-and-socket joint can form.

For key particles simple spheres are most preferably used (although other complimentary shapes, curvatures and sizes are appropriate as well). Various constituents can be interchangeably used, such as silica, poly(methyl methacrylate) (PMMA) or polystyrene (PS) spheres of different sizes depending on the geometry of the final assembly and on the physicochemical properties that are to be built.

Figure 1B:
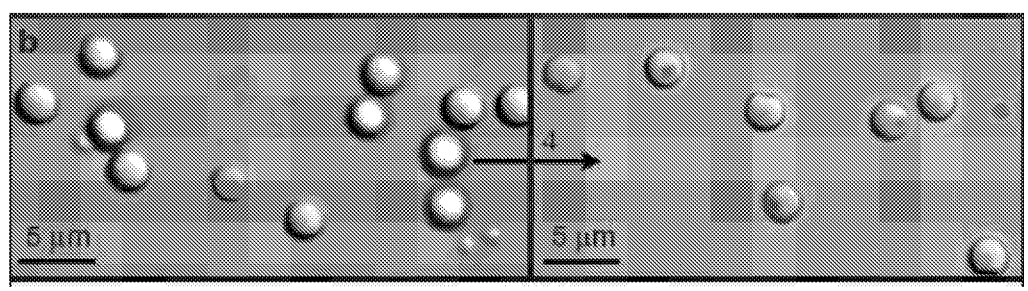
FIG. 1B in the last step (4) of FIG. 1A illustrated by optical microscopy wherein after polymerization, cavities are visible as darker spots on the particles' surfaces.
Figure 1C:
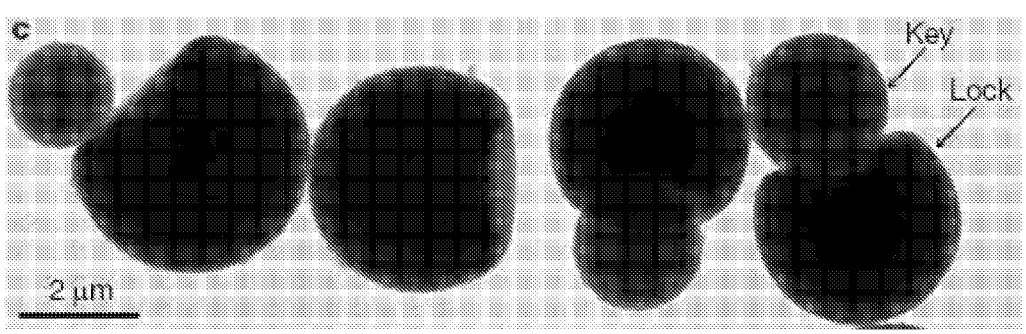
FIG. 1C shows the complementary fit between the locks and the spherical keys (here silica), which is clearly visible in this TEM image.

For lock particles, as mentioned hereinbefore, a spherical particle is preferably used with a single spherical cavity (FIG. 1). These particles act as locks when the radius of the spherical cavity matches the radius of the key particles.

The lock particles can be made from monodisperse oil droplets which are nucleated via a base-catalyzed hydrolysis and polymerization of 3-methacryloxypropyl trimethoxysilane (TPM). More precisely, the TPM is solubilized in water by slow hydrolysis, and then rapidly polymerized into low molecular weight oligomers via a polycondensation reaction. The TPM oligomers phase separate forming charged-stabilized oil-in-water emulsion droplets that can be grown to the desired size by seeded growth. To create the cavities, a second polymerization is performed of the oil phase, now acting on the acrylate moieties of the TPM oligomers. This radical polymerization grows a rigid cross-linked shell around the droplets and simultaneously causes the contraction of the liquid core while it polymerizes. The contraction drives a controlled shell buckling forming spherical cavities on the particles (see FIGS. 1B and 1C). In one embodiment, substantially 100% of the oil droplets buckle to form lock particles. A typical synthesis yields approximately 0.1 g of particles per ml of reaction mixture. Bulk quantities of 20-500 ml or approximately $10^{10}$-$10^{13}$ particles are routinely produced. Moreover, 100% of the particles undergo the buckling required for the depletion binding. The synthesis protocol is sketched schematically in FIG. 1A and described in greater detail hereinafter.

The complementary geometry of our simple building blocks—e.g., a spherical key fitting into the spherical cavity of a lock—becomes a site-specific lock-and-key interaction in the presence of a short-range attraction between the surfaces of the lock and key particles. To induce such an attraction we use the depletion interaction, which is induced by adding a non-adsorbing water-soluble polymer—the depletant—to the system. The depletion interaction, has its origin in the entropy associated with the center of mass of the polymers and can be understood as follows. Around each colloidal particle, there is an exclusion layer whose thickness is given by the radius $r_p$ of a polymer molecule; the polymer is excluded from this region because its center cannot approach the colloid surface any closer than $r_p$ (see FIG. 2A). However, if the surfaces of two colloidal particles come closer than $2r_p$, their exclusion volumes overlap and the total volume from which polymers are excluded decreases by the amount of their overlapping exclusion volumes $\Delta V$. This increases the total volume available to the polymers by $\Delta V$ thereby increasing the entropy of the polymers, which reduces the free energy of the system by $$F_d \approx k_B T n_p \Delta V, \tag{1}$$

where $n_p$ is the number density of polymers, T is the temperature, and $k_B$ is Boltzmann's constant. The free energy reduction $\Delta F_d$ associated with two particles coming together represents the binding energy due to the depletion interaction and is determined, according to Equation (1), by the overlap volume $\Delta V$ and the number density of polymers $n_p$, while the range of the interaction is given by the polymer diameter $2r_p$. In the experiments described below, poly(ethylene oxide) (PEO) with a molecular weight of 600,000 is used as the depletant polymer, unless stated otherwise.

Figure 2A:
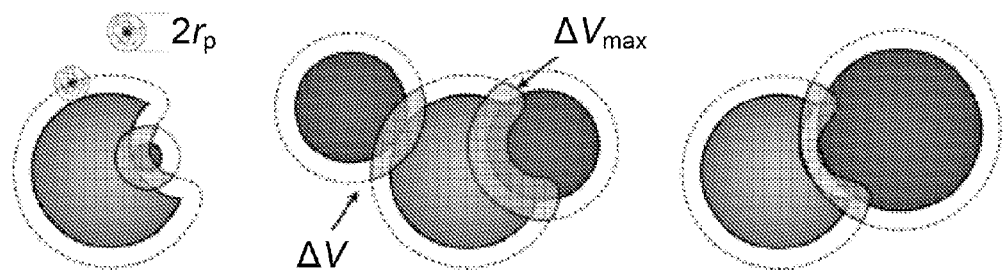
FIG. 2A shows in (1) the depletion attraction potential between lock and key being proportional to the overlapping excluded volume $\Delta V$, which attains a maximum $\Delta V_{max}$ for the configuration where the key particle, by virtue of its size and position, precisely fits into the spherical cavity of a lock particle; for all other configurations, $\Delta V < \Delta V_{max}$ in (2); because the depletion interaction is also proportional to the density $n_p$ of the polymer depletant in solution, the interaction can be tuned by adjusting $n_p$ so that it is sufficiently strong to bind two particles in (3) only for the lock-and-key configuration.

FIG. 2A illustrates different non-limiting examples of ways a spherical key particle can interact with a lock particle. Key particles of varying sizes experience a depletion attraction when their surfaces come within $2r_p$ of each other. Clearly, the overlap of the exclusion volumes, and hence the depletion attraction, is maximized when the cavity of the lock particle is occupied by a spherical key particle whose radius matches that of the cavity.

Figure 2B:
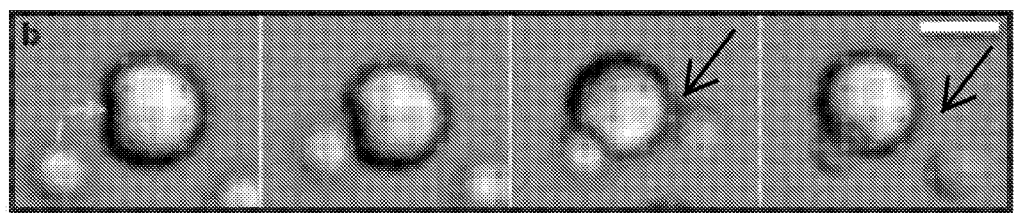
FIGS. 2B and 2C are several example frames from a movie showing an example of depletion-driven self-assembly of lock and key particles; the site-specificity of the interactions is captured in the sequence of FIG. 2B where two examples of, respectively, successful (green) and unsuccessful (red) lock-key binding (Scale bars, 2 μm)
Figure 2C:
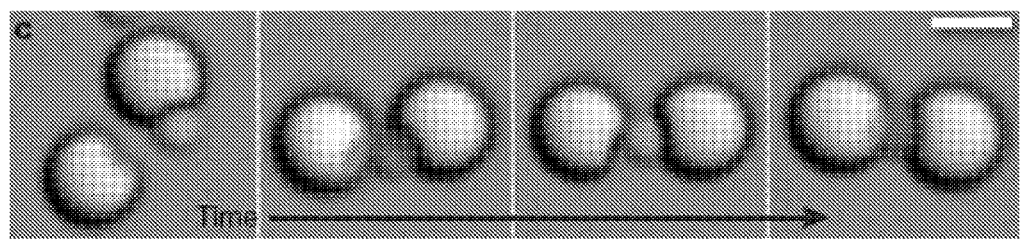

Site-specific binding is demonstrated by mixing lock and key particles in aqueous suspension with depletant. Using an optical microscope, key particles are found to dock and bind permanently only to the cavity of the lock particle. This behavior is captured in the sequence of frames from a "movie" presented in snapshots in FIG. 2B, which shows two key particles approaching a single lock particle by random Brownian motion. The particle that encounters the concave cavity of the lock particle docks and binds, whereas the particle that encounters the convex exterior fails to bind. This illustrates the site-specific binding of this scheme. The lock-and-key binding is permanent as long as the concentration of the depletant is not substantially decreased. In fact, the exposed surface of the key particle can accommodate the docking of a second lock particle, as illustrated in FIG. 2C. Docking of more than two lock particles is possible as well, a point to be described hereinafter.

Figure 3A:
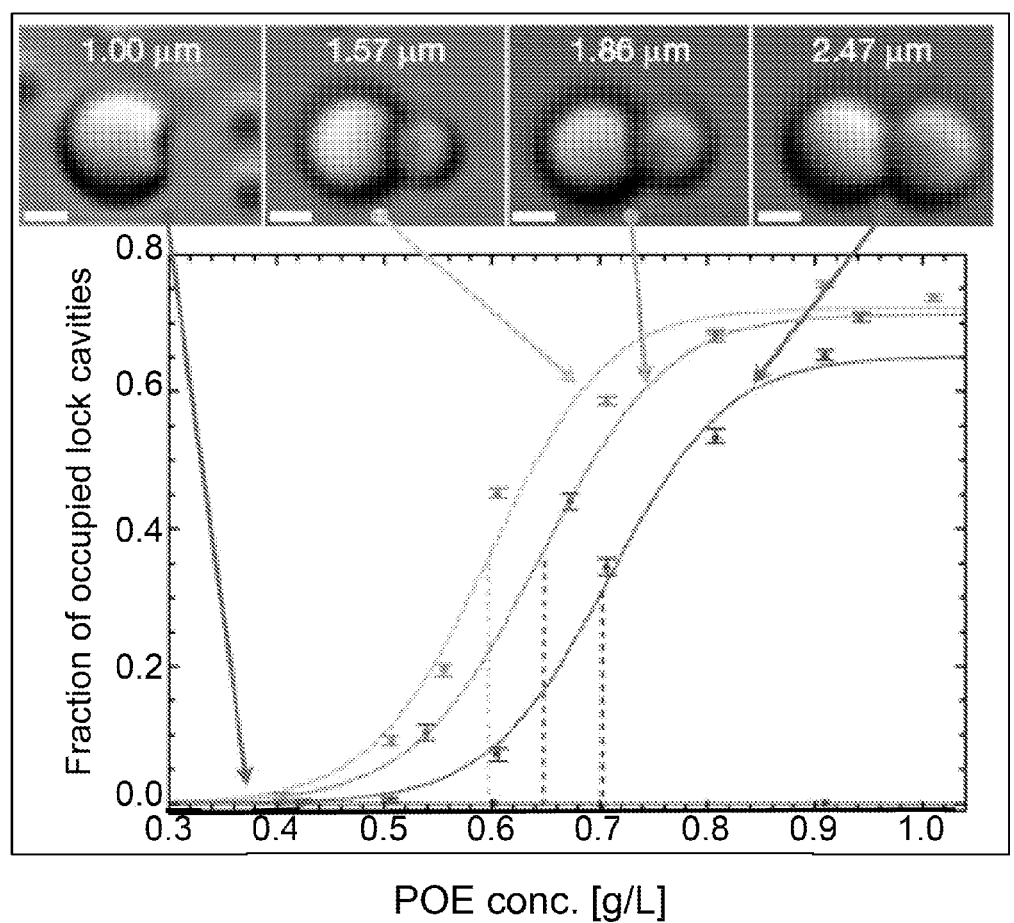
FIG. 3A shows experimentally measured lock-key association curves (dark dots) for different key particles along with fits to the model (full line) described in the text; each data point represents the ratio $n_{LK}/n_L$ of the number of bound lock-key complexes to the number of lock particles in the sample; the values of $n_{LX}$ and $n_L$ were obtained by counting the number of locks and lock-key complexes in different areas of the samples, with $n_L \sim 10^3$ for a typical data point; the error bars reflect the statistical error associated with the finite data sample; the assembly is driven by depletion attractions and the lock-key selectivity is provided by the degree of their excluded volume overlap; 1.57 μm spherical keys maximize the overlap and assemble into lock cavities at the lowest depletant concentration (dashed yellow line); for a poor match the assembly occurs at higher depletant concentration, however, while the overlapping volume of large (2.47 μm) keys in contact with cavity rims is still sufficient to give specific lock-key binding, smaller keys (1 μm) do not bind at all.

This site-specific binding is reversible and can be controlled by varying the depletant concentration $n_p$, which reduces the binding energy (see Equation 1). FIG. 3A shows the results of measurements of the equilibrium fraction of bound lock-and-key pairs as a function of depletant concentration for four different sizes of key particles. There is no binding at low depletant concentration as the depletion interaction is not sufficiently strong to overcome the electrostatic repulsion and the loss of configurational entropy that occurs when two particles bind. As the concentration is increased past a critical value $n_p^c$, however, binding occurs and the fraction of bound particles increases with increasing depletant concentration.

A desirable feature in preferred embodiments for programmable self assembly is selectivity, namely the ability of basic building blocks to recognize the right pieces with which to bind in a "sea" of foreign objects. In the system herein such selectivity is driven by the geometry of the surfaces: surfaces of size and shape (spherical or otherwise) that fit together maximize the overlap of excluded volume and are favored.

To investigate the selectivity of particles, the influence is evaluated of the size mismatch on lock-and-key binding by measuring the number of bound lock-and-key complexes as a function of depletant concentration for a given lock size and three different key sizes. As expected, the concentration of depletant required to observe binding is lowest when the radii of the sphere and cavity are well matched (see FIG. 3A, R=1.57 µm). As the mismatch is increased, the concentration of depletant required to observe binding also increases. However, the shift on either side of ideal matching is not symmetric. In particular, small keys (FIG. 3A, R=1.00 µm) fail to bind for relatively small deviations from ideal size matching whereas larger keys (FIG. 3A, R=1.86 µm, 2.47 µm) exhibit lock-and-key binding well above it. This asymmetry can be understood simply in terms of the overlap of excluded volume, which is significantly larger for a large sphere in contact with the lock cavity rim than it is for a small sphere inside the lock cavity (see FIG. 2A).

Figure 3B:
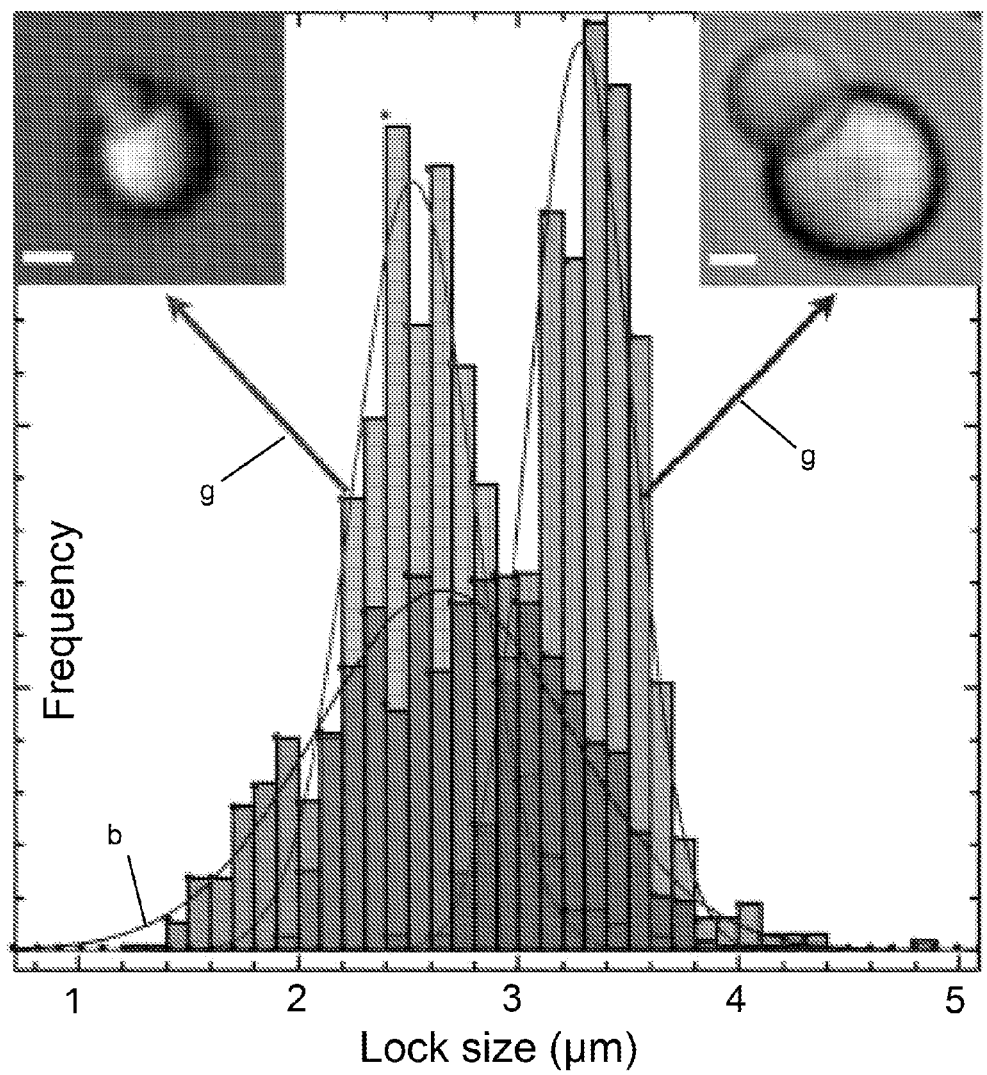
FIG. 3B shows two different sets of monodisperse keys (in the micrographs R=1:54 μm and 2:47 μm), each mixed with a polydisperse population of locks ("b"), selectively bind to their best matching complementary particles, as a result, the lock particle size distribution in the assembled lock-key complexes ("g" and "r") peaks at two different values. (Scale bars, 1 μm)

To further investigate the selectivity, two suspensions were prepared containing the same polydisperse distribution of locks. Because the radii of the cavities scale with the size of the locks, these suspensions have a polydisperse distribution of cavity radii. Monodisperse spherical keys were added with a radius of 1.54 µm to one suspension and a monodisperse keys with a radius of 2:47 µm to the other. The concentration was progressively increased of depletant to $n_p^c$ where the size distribution of locks was measured that were bound to keys. The results, displayed in FIG. 3B, show that keys with radii of 1:54 µm and 2:47 µm, bind to two distinct locks populations, centered at lock radii of 2:59 µm and 3:32 µm, respectively, illustrating the selectivity of the binding between locks and keys. In a more general sense one can also use a plurality of keys for a single lock.

The binding and unbinding of locks L and keys K can be modeled by considering the change in free energy associated with the reaction L+K=LK, where LK represents a bound lock-key complex. Locks and keys have a purely entropic free energy associated with their configurations within the sample volume V. The lock-key complexes are bound with an energy $E_b$ and their center of mass has a configurational entropy similar to that of an unbound lock or key, but in addition they have a configurational entropy associated with fluctuations in relative position within a small binding volume $V_b$.

Treating the unbound and bound species as dilute gases and equating the corresponding chemical potentials the law of mass action is obtained for the reaction:

$$\frac{n_{LK} n_0}{n_L n_K} = f^{[E_b - k_B T \ln(V_b n_0)]}, \quad (2)$$

where $n_0$ is the total number density of locks and, $n_L$, $n_K$, and $n_{LK}$ are the equilibrium densities of unbound locks, unbound keys and bound lock-key complexes. The binding energy between locks and keys $E_b$ minimizes the sum of the attractive depletion interaction and the repulsive screened Coulomb interaction between the negatively charged locks and keys. For binding to occur, $E_b$ must be attractive and large enough to overcome the loss in configurational free energy that accompanies the binding of two particles.

The measured fraction of bound locks and keys $n_{LK}$ is consistent with a binding energy $E_b$ calculated using a simple model in which the depletion and Coulomb interactions are approximated as occurring between flat plates having an effective area that depends on how well the lock and key surfaces match. For a Coulomb potential based on the measured zeta potential of the particles (70 mV) and salt concentration, a depletant radius of 57 nm (corresponding to the radius of gyration of the polymer), the remaining energetics are determined only by geometry. While precise values are not known a priori, the fits to the data correspond to geometrical factors consistent with the size and goodness of the match between the locks and keys.

Figure 4A:
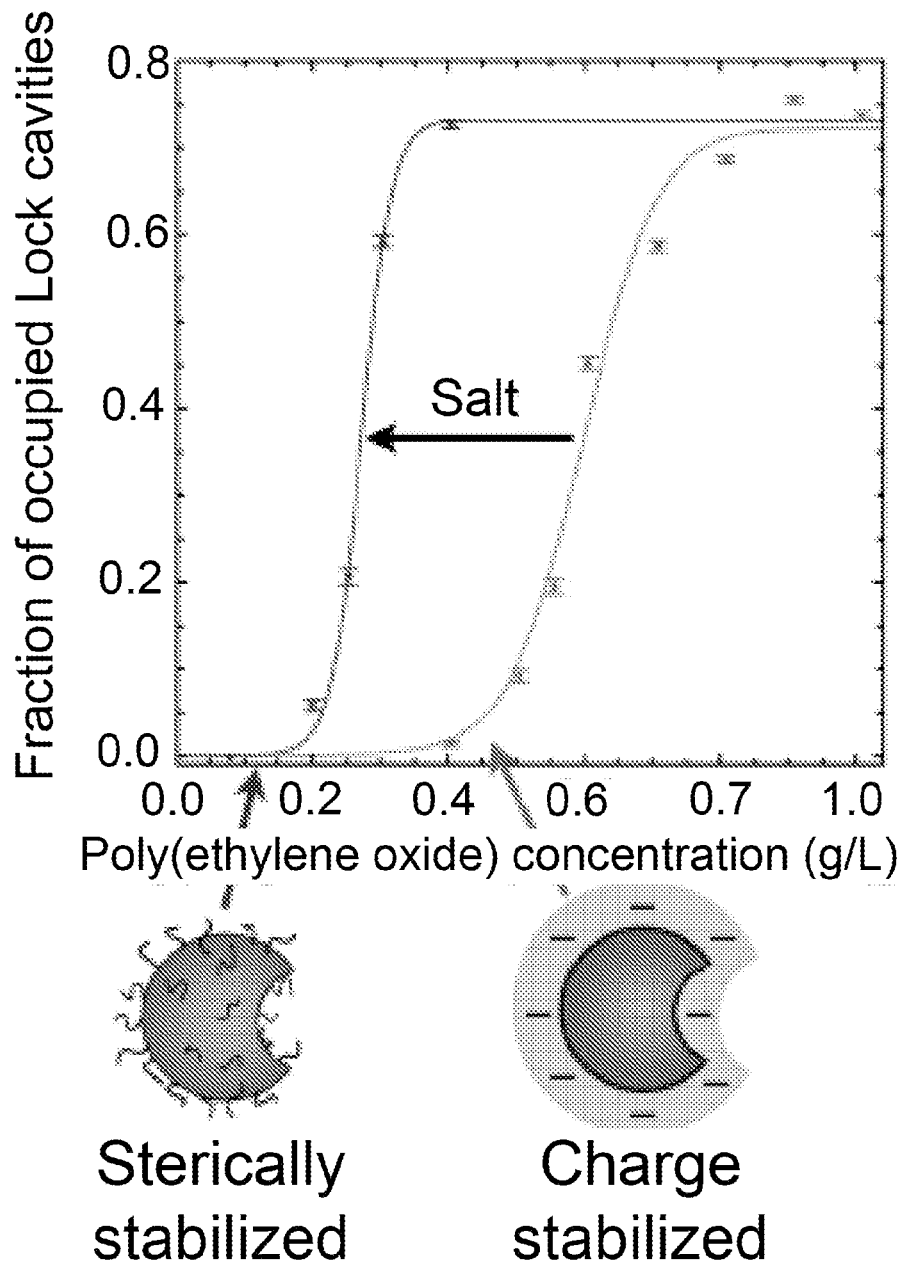
FIG. 4A shows the concentration of salt is increased to the point that it is necessary to add a steric layer (Pluronic® F108, average $M_w$=14600) to the particles in order to prevent aggregation, a significantly lower depletant concentration is needed to drive the assembly, resulting in a shifted and sharper lock-key binding transition.

The particles used in the preferred embodiments, both locks and keys, are charge stabilized, which produces a soft repulsive screened Coulomb potential with which the depletion attraction competes. Alternatively, locks and keys can be prepared with a grafted layer of hydrophilic polymer on their surfaces, which leads to a short-range nearly hard-sphere steric repulsion. In FIG. 4A are shown binding curves for identical lock and key particles, stabilized in one case by charge and the other by a layer of Pluronic F108 copolymer grafted onto the particle surfaces. The binding curves show that the transition in sterically-stabilized system is sharper and occurs at a significantly lower concentration of depletant (0.28 g/L vs. 0.61 g/L). This demonstrates that the lock-and-key interaction can be tuned to a considerable extent.

Figure 4B:
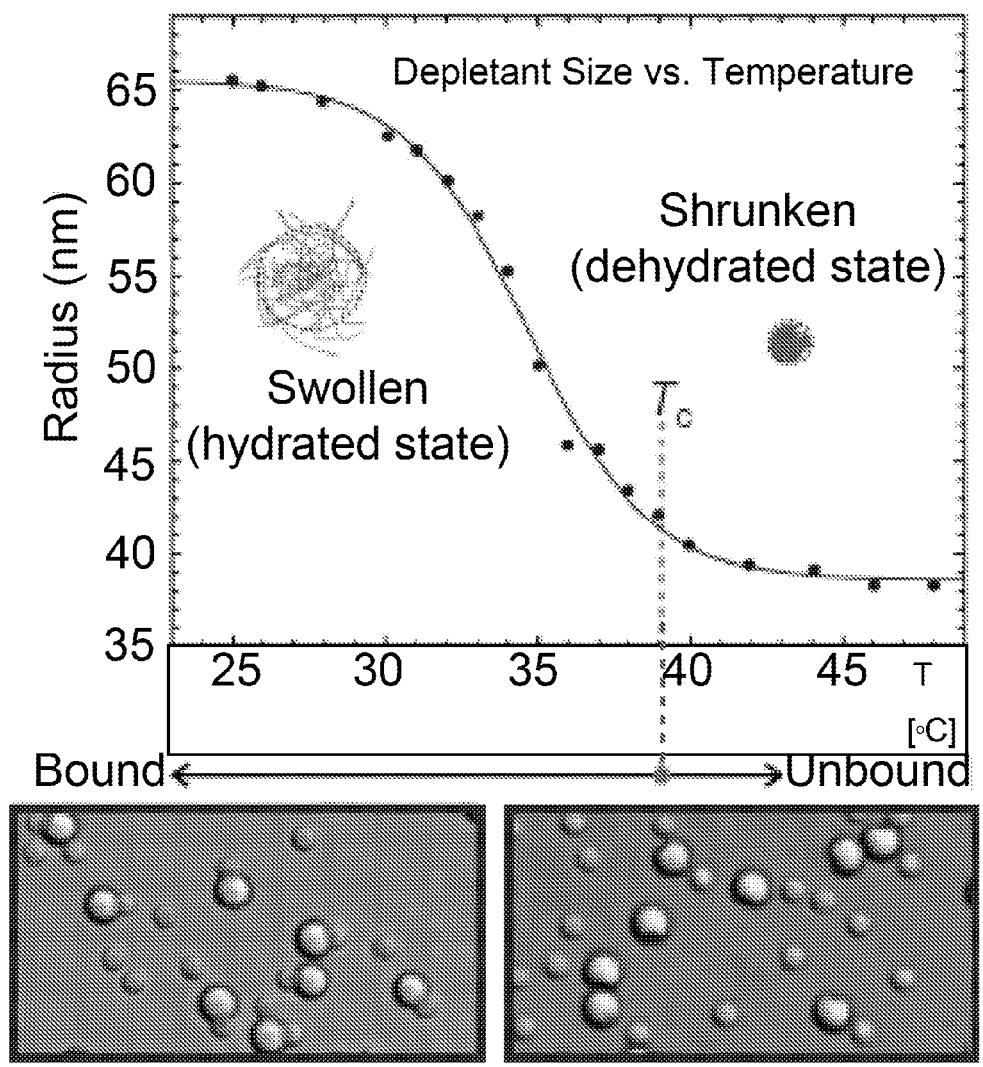
FIG. 4B shows thermosensitive microgel particles which can be used as a depletant to implement a simple temperature switch for the lock-key binding reaction; at the transition temperature $T_c$ the depletant shrinks to a size too small to give an effective lock-key attraction and the key particles are released.

Manipulating the binding and unbinding of particles is important for controlling their self assembly. As described hereinbefore, this can be done by varying the depletant concentration. However, it can be more convenient to use temperature to control self assembly. To this end, a depletant was employed that consists of microgel particles that change their size when the temperature is changed. This embodiment allows direct control over the range and depth of the depletion potential (by changing $\Delta V$ in Equation 1). In one example, poly-NIPAM particles that where used, in their swollen hydrated state at room temperature, have a size close to that of the polymer used in the previous experiments. Thus, the lock-and-key binding occurs at a similar depletant concentration. When heated above their lower critical solution temperature (here about 40° C.), the microgel particles shrink (see FIG. 4B) such that the range and depth of the attractive depletion potential falls below that required for binding. As a result, substantially all locks release their bound keys, as shown in FIG. 4B.

Figure 4C:
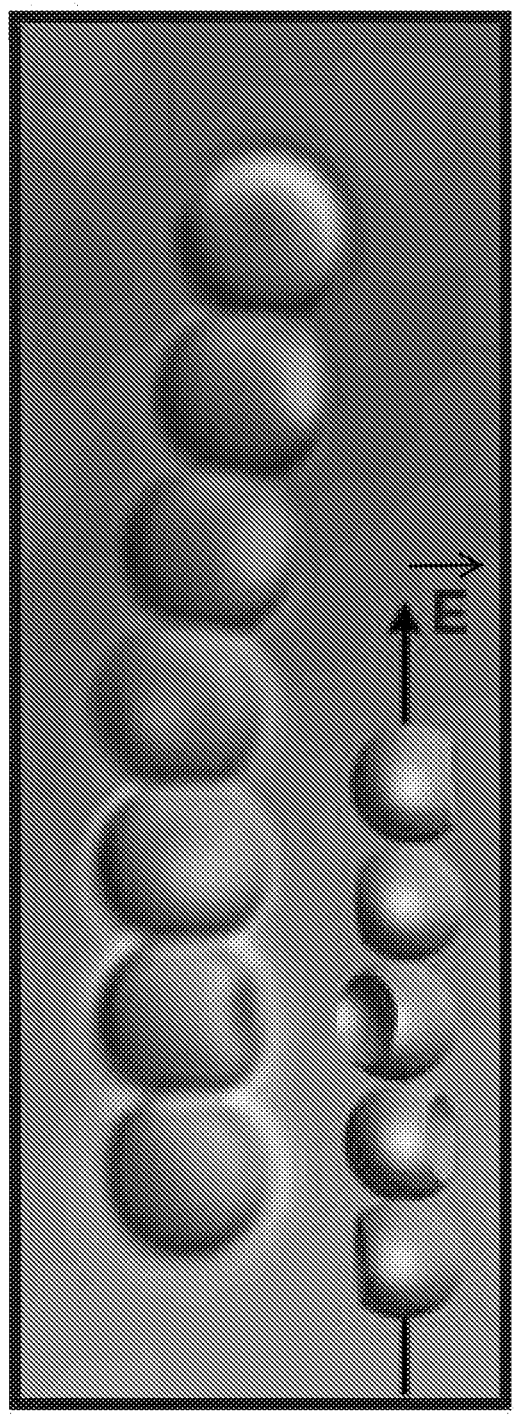
FIG. 4C shows the anisotropic shape of the lock particles allows the use of an external electric field to control the orientation of the lock cavities and to assemble lock particles in "daisy-chain"-like structures.

In addition to temperature, the assembly of particles can be controlled by an externally applied electric field. In one embodiment, because of their shape anisotropy, locks organize in chains (such as of polymeric chains as well as monomers, dimers, trimers, etc.) with their cavities all arranged perpendicular to the field, as shown in FIG. 4C. It should be appreciated that a combination of temperature and electrical fields or ferromagnetic depletants may be used in various embodiments.

Figure 5:
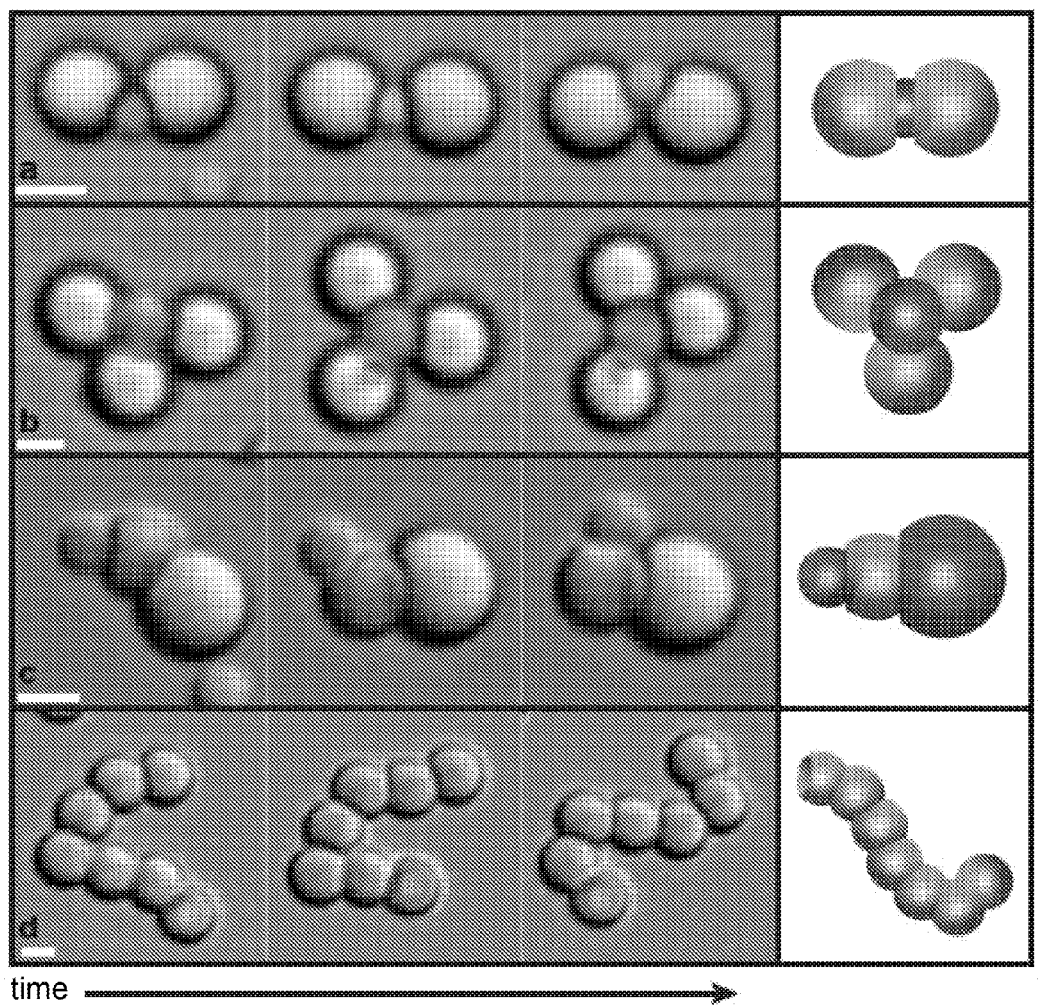
FIG. 5 (section "a") shows flexibility of the lock-key junctions in self assembled colloidal molecules and polymers by time-lapse optical microscopy images (time sequences a-d)

A useful feature of the lock-and-key assemblies is that the bonds between particles are flexible. Spherical keys fitting inside matching lock cavities form ball-and-socket joints held together by the depletion force. The absence of chemical bonds at the junction means that an appropriately shaped key can rotate within the appropriately shaped cavity of a lock (such a partially spherical recess and a spherical key particle). When two or more locks are bound to a single key, this rotation becomes visible under an optical microscope. Examples are shown in FIG. 5 in time assembly sequences a, b, c and d. The assembly of monomers, dimers, trimers and tetramers occurs simply by progressively increasing the size of the central key particle to make room for extra locks to dock. This flexibility provides an additional degree of freedom that, together with the reversible binding, facilitates annealing during the assembly of larger structured aggregates. In the absence of spherical keys, locks with sufficiently large cavities assemble in a head-to-tail configuration forming polymeric worm-like chains that diffuse and grow in solution (see FIG. 5, time sequence segment d), provided the depletant concentration is sufficiently high. Many other configurations can be used as well, employing the basic teachings in the described embodiment including the snowman-like particles shown in FIG. 5, time sequence segment c. These form when monodisperse keys are mixed with two different sets of locks.

It should be appreciated that either the lock particle, or the key particle or both may have additional structural components, such as chemical moieties capable of bonding with additional particles. These additional structural components may be added to the lock particle or the key particle prior to interaction of the lock and key particles or thereafter. The activity of such additional structures may be activated by additional of an activating agent or a change in the environment, such as but not limited to the pH or temperature.

This work demonstrates that the self-organization of colloidal particles by means of directional, selective and reversible interactions can be essentially reduced to a simple geometrical problem. Not being limited by surface chemistry, lock-and-key interactions allow the direct assembly of basic building blocks regardless of their nature and composition. This directed mechanism of particle self-assembly may be used for engineering "smart" composite particles, new functional materials, and microscopic machinery with mobile parts. These systems enable ready manipulation of rheological properties, magnetic rheological properties, electro rheological properties, coating of drugs, application or placement of selected chemically active species at precise locations, placement of magnetic, paramagnetic or diamagnetic particles at desired locations and even for construction of quasicrystals.

In another embodiment of the invention, shape plays a fundamental role in self-assembly as it can regulate particle's recognition, determine the density and the structure of particle packings and facilitate binding from ligand molecules. Ideally, patterned surfaces and tailored functionality could act in concert with the shape anisotropy of the building blocks to focus interactions between particles and assist, direct or enhance their self-organization. In this embodiment, a general strategy is provided to design and mass-produce colloidal building blocks with anisotropic shapes and site-specific reactivity. One non-limiting example method is based on biphasic particles that result from a heterogeneous nucleation of silicone oil droplets in the presence of solid polystyrene seeds. The seeds can be entirely engulfed in the oil phase or trapped at the interface, depending upon their surface charge. Sulphonated polystyrene seeds at pH of 9, for example, sit at the oil-water interface whereas amine-modified particles, in the same conditions, are entirely encapsulated in the oil as shown in FIGS. 6A and 6B, respectively. After nucleation, the oil can either be solidified by means of a radical polymerization reaction to obtain composite particles, or trivially dissolved in ethanol, or other conventional solvent, to recover the polystyrene seeds. The composite colloids are comprised of two chemically different polymers: the polymerized oil, consisting in a highly crosslinked silsesquioxanes network (organosilica), and a linear polymer (polystyrene). In the figures presented in this paper, the organosilica and the polystyrene are highlighted. Because the polymers are compartmentalized and have different chemistries, discrete portions of a particle can be selectively functionalized or dissolved. This is illustrated in FIGS. 6A-6B showing how particles with well-defined spherical cavities can be fabricated by washing the composite colloids in pure toluene. The organic solvent rapidly dissolves the polystyrene leaving the crosslinked polymer unaffected. The generality of the method is demonstrated in FIG. 6C, where we apply the same heterogeneous nucleation principle to spherical, ellipsoidal and cubic seeds. By varying the experimental conditions (see Example II), multiple oil droplets can be controllably grown on the same seed to yield dumbbells or particles with multiple protrusions as schematized in FIG. 7A.

If, instead of polymerizing the oil phase, the solid polystyrene phase is liquefied by allowing the seeds to absorb toluene (see FIG. 7B), an entirely new family of particle shapes can be generated. The liquified PS seeds do not mix with the silicon oil, but they gradually deform driven by surface tension. The equilibrium shape of such a multiphase particle will depend on the amount of added toluene which in turn sets the contact angles between the three liquid phases: water, silicon oil and toluene-swollen PS. Because of the slow rate of the deformation, all the intermediate out-of-equilibrium shapes can be fixed at will by stripping the toluene off and allowing the polystyrene to return to a solid state. From these newly shaped particles a second generation of anisotropic and shape-complementary colloids is obtained by selectively dissolving one polymer or the other. In particular, the organosilica part is recovered by washing the particles in toluene and the polystyrene is isolated by washing the silane oil off prior to its polymerization (see FIG. 7C). Using this simple principle bulk quantities can be obtained of monodispersed colloids shaped like disks, bowl, lentils and dumbbells but also particles with well-defined cavities, flats and protrusions.

The different nature of these bi-material particles opens new avenues to fabricating Janus or patchy colloids in bulk amounts. Silane chemistry, for example, can be selectively performed on the organosilica polymer leaving the polystyrene unaffected, whereas hydrophobic molecules, such as fluorescent dyes, can be preferentially absorbed and concentrated in the polystyrene phase and remain physically or chemically trapped here. FIGS. 8A(1)-8B(2) show fluorescent Janus colloids that were prepared by first swelling the PS hemisphere of TPM-PS composite particles with a polymerizable fluorophore (NBD-MAEM), followed by a locking polymerization reaction to fix the fluorescent dye inside the particles. Alternatively, TPM soluble molecules can be dissolved in the oil prior its polymerization and chemically bond via silane chemistry. This was tested by adding rhodamine-B-isothiocyanate dye coupled with 3-aminopropyltriethoxysilane (RITC-APS) to a suspension of biphasic particles prior to the polymerization of the TPM phase. The fluorescent dye covalently binds only to the TPM molecules as a result of the condensation reaction between the APS and TPM silane moieties.

Figure 10C:
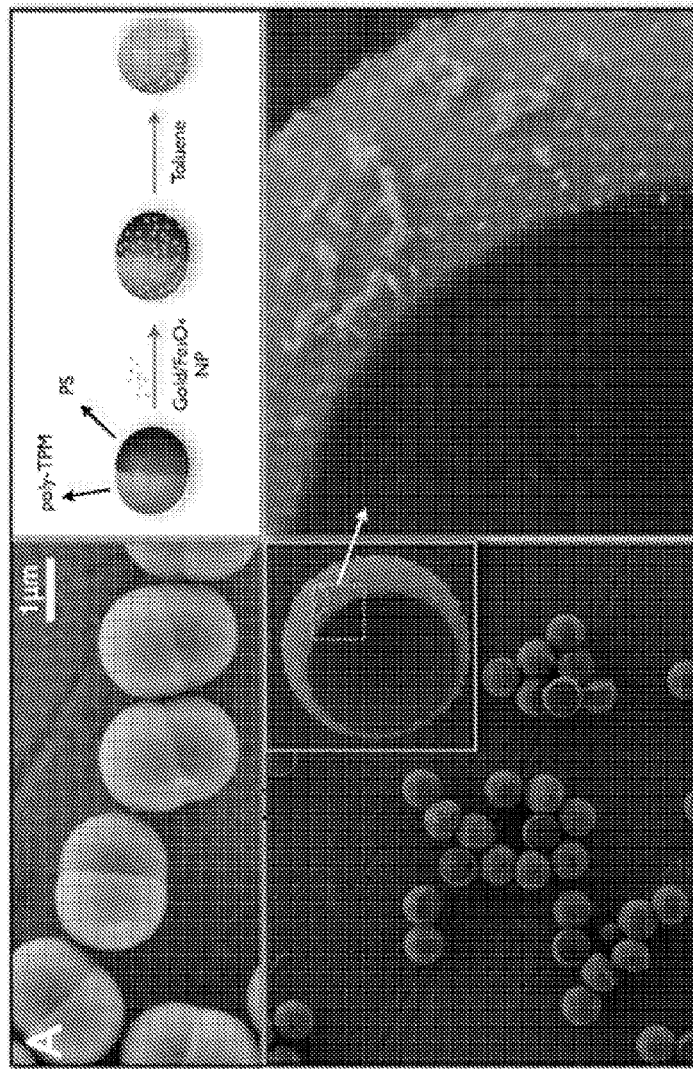
FIG. 10C shows a time-lapse of a TMP-PS particle coated with inorganic nano particles and suspended in toluene; because TPM has the same refractive index of toluene the optical contrast is mostly given by the inorganic coating; the polystyrene part of the particle, which is visible in the first image as a white dome (higher refractive index), quickly dissolves in toluene, exposing a clean TPM surface, after the complete dissolution of PS, the particles are transferred in water where they form stable suspension.
Figures 11A, 11B:
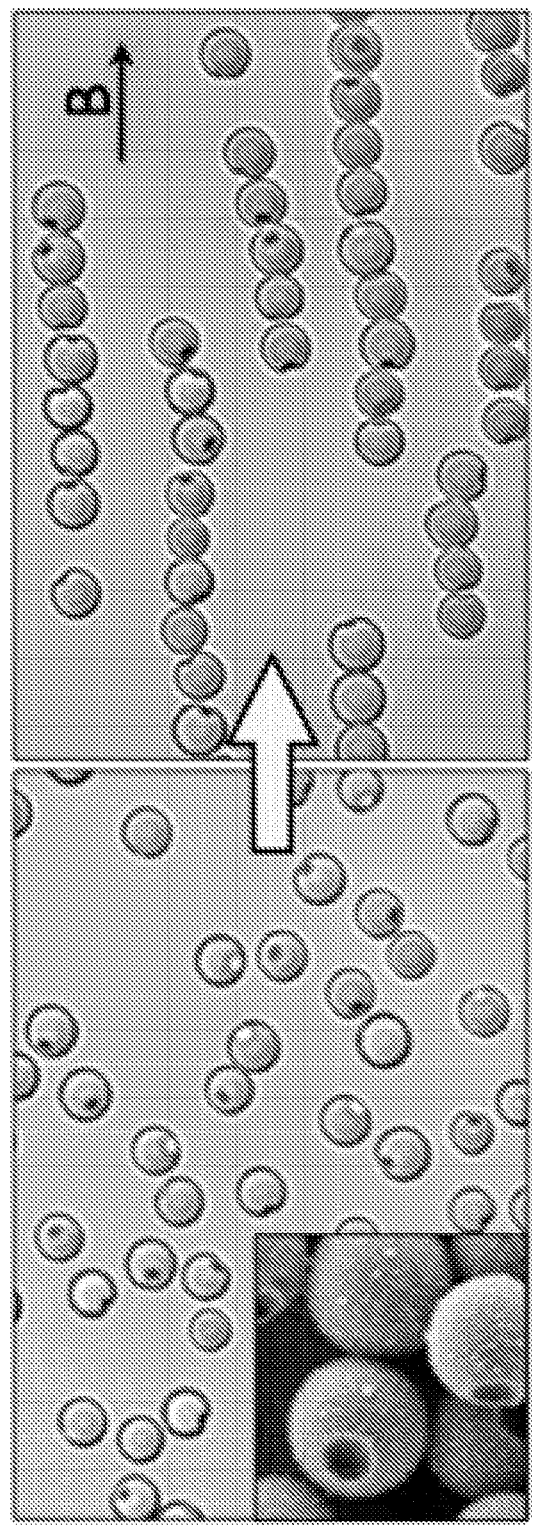
FIGS. 11A and 11B show an example of magnetic manipulation by using the method described in FIGS. 10A(1)-10B(2) for synthesized colloids decorated with $Fe_3O_4$ nano particles; the magnetic material coats the whole particle surface with the exception of a spherical cavity; upon exposure to a magnetic field the particles can be magnetized as demonstrated by formation of dipolar chains.

A portion of the particle's surface can be functionalized to obtain more complex patchy colloids also. One of the two polymer species can be employed as a sacrificial protective layer. This concept is also shown in FIGS. 8B(1)-8C(2) where composite TPM-PS particles were first homogeneously coated by gold nano-particles and then washed in toluene to remove the PS and expose an uncoated TPM surface (see more details in Example II). Gold-coated anisotropic particles, in particular, are of interest not only in self-assembly; but also in biomedical applications as gold offers a versatile substrate for further functionalization including fluorescent markers, DNA and other biomolecules. The generality of this principle can be shown by coating the biphasic colloids with iron oxide nanoparticles, instead of gold, thus realizing magnetizable building blocks that can be remotely manipulated with the use of external fields (see FIGS. 10A(1)-10C).

Figure 9A:
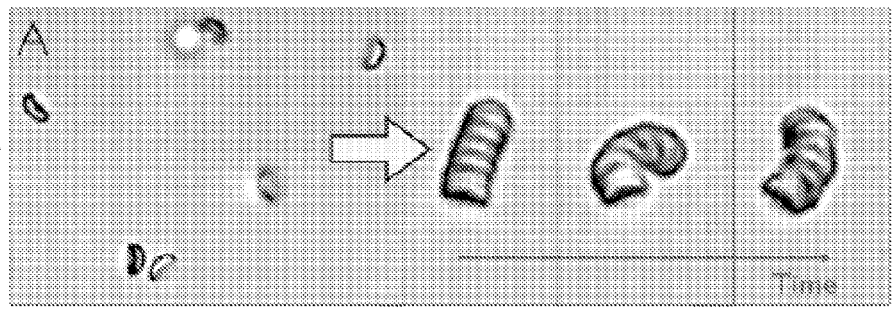
FIGS. 9A-9C show self-assembly via shape-selective depletion interactions.
Figure 9B:
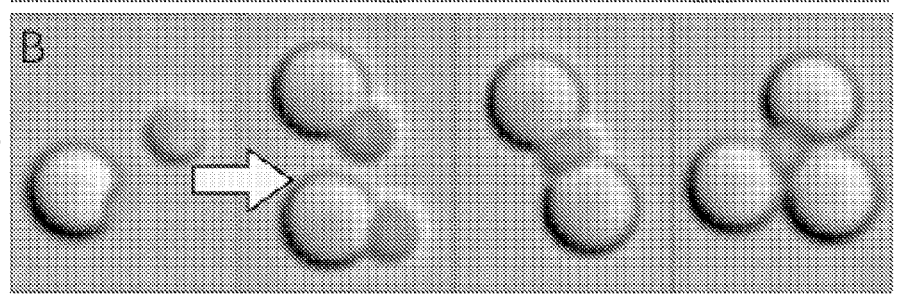
Figure 9C:
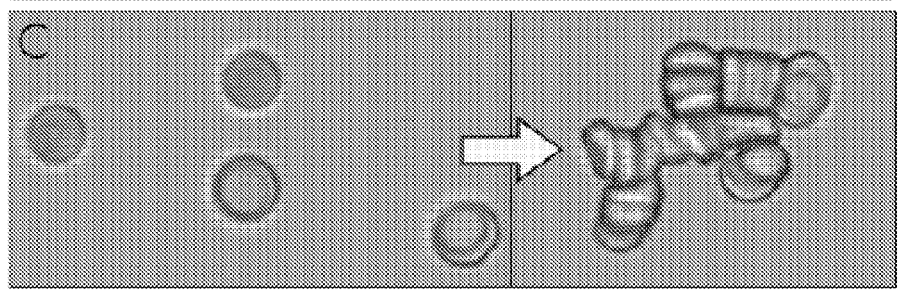

Another important feature of our method is the ability to produce building blocks with perfect shape complementarity. In the previously described first embodiment, shapes can be exploited to drive selective lock-and-key binding between colloids, thus realizing a simple mechanism of particle recognition and binding. This mechanism, however, requires independently fabricating sets of complementary building blocks whose "matching" geometries were generally obtained via a lengthy trial-and-error iterative process. With this alternative embodiment, the synthesis of such colloidal particles is simplified, as the complementary pieces are now simultaneously generated by an effective subdivision of composite particles (see FIG. 7C). In FIGS. 9A-9C depletion forces are used to organize the particles into architectures, which are determined by the geometry of the constituent building blocks.

The following non-limiting examples illustrate various aspects of the invention.

Example I

The precursor emulsion for the synthesis of lock particles is prepared by a modification of a hydrolysis and polymerization method known in the art. Typically, 750 µL of TPM are first hydrolyzed in 15 mL of deionized-water and then mixed to 30 mL of aqueous $NH_3$ 0.4M. The ammonia catalyzes a polycondensation reaction yielding low molecular weight TPM oligomers that in water rapidly phase separate forming a charge-stabilized emulsion. The resulting oil-in-water emulsion droplets are grown to the desired final size by feeding the emulsion with a solution of hydrolyzed TPM 0.2M. To form the cavities, the emulsion is further polymerized by adding a radical initiator ([KPS]=0.45 mM) and heating at 75° C. for 6 hours. Specially modified locks with a polyacrilamide coating are prepared to prevent aggregation when mixed to pNIPAM particles. The coating is realized by mixing 20 mL of the lock suspension with 80 mg of acrylamide and 20 mg of KPS and heating at 75° C. for 3 hours.

Key particles of silica are prepared by well-known methods, such as the Stöber method (see, e.g., Stöber, W., Fink, A. & Bohn E. "Controlled growth of monodispersive silica spheres in the micro size range," J. Colloid Interf. Sci. 26, 62-69 (1968)). PMMA and styrene particles are prepared by a standard surfactant-free emulsion polymerization. pNIPAM particles were synthesized according to the method described by Pelton (see, e.g., Pelton, R. H. & Chibante, P., "Preparation of aqueous lattices with n-isopropylacrylamide" Colloids Surf. 20, 247-256 (1986)). After preparation all the colloidal systems are washed and redispersed in deionized water. The binding curves in FIG. 3A are obtained by measuring the fraction of lock-key complexes recorded in a series of 10 microscopy images after an equilibration time of 30 minutes. Thermo-reversible lock-key binding experiments are performed by gluing samples on heated indium-tin-oxide coated microscope slides. Electric-field-induced lock assembly is performed by bringing lock suspensions in contact with two parallel indium electrodes 200 μm apart with a typical AC electric potential of 20V at 50 kHz.

Example II

A method of producing a heterogenous article of manufacture by nucleation of TPM droplets is demonstrated in this example. This method and the resulting article of manufacture comprises various steps, including some optional steps, of providing TPM, hydrolyzing the TPM to provide a solution, disposing seeds in the solution and controlling concentration of the seeds to provide a controlled TPM particle morphology, processing the seeds to plasticize and deform the seeds using an appropriate chemical agent, isolating the processed seeds by dissolving the unpolymerized TPM, and dissolving the seeds to form colloidal TPM particles with selected cavities. Inorganic nanoparticles can be coupled to the colloidal particles by selected linkages or patches; and depletion agents or other energy mechanisms, such as electrical, magnetic, acoustic or electromagnetic waves, can be used to drive self assembly of the TPM colloidal particles, The linkages or patches mentioned above thus can enable a general method to produce an article of manufacture comprising forming patches between the base colloidal particles and any desired coupled particles to provide self assembly, not only of the colloidal particles, but also the coupled particles. These coupled particles can have virtually any functionality apart from the base colloidal lock and key particles used to effect the self assembly. In a typical experiment, 10 mL of 3-methacryloxypropyl trimethoxysilane (TPM, >98% from Sigma-Aldrich) were hydrolyzed in 100 mL of deionized water by vigorous stirring for about 3 hours. Next, 15 mL of this solution were rapidly mixed with 30 mL of an aqueous suspension containing 6.5 μL of $NH_3$ 28% and 75 μL of a stock seeds suspension (1.4 μm negatively PS spheres from Life Technologies, Sulfate Latex, 8% w/v). Occasionally, various other seeds were used: 1.6 pm negatively charged PS spheres (Life Technologies, Sulfate Latex, 8% w/v), 1.4 μm positively charged PS spheres (Life Technologies, Amidine Latex, 8% w/v), negatively charged PS rods (kindly provided by the Solomon group), and hematite cubes (synthesized following the method described by the Sugimoto group). The mixture was left undisturbed for up to 3 hours to allow the TPM droplets to nucleate and grow on the seed. Occasionally, the addition of TPM was repeated a few times to obtain the desired particles size.

At low seeds concentration 0.013% (75 μL of the stock 8% w/v seeds suspension) the TPM nucleates almost exclusively on the PS seeds forming a single droplet. However, when the seeds concentration is raised to ~0.044% (25 μL of the stock suspension) the particles morphology changes dramatically and monodispersed dumbbells, consisting in a central PS sphere and two opposite TPM lobes, are obtained. Small TPM droplets are often observed as a result of secondary (homogeneous) nucleation but are easily separated via a few sedimentation and resuspension cycles.

After the nucleation of the TPM droplets, the spherical PS seeds were plasticized and progressively deformed by adding small amounts of toluene (typically in the order of 100 μL of toluene per 30 mL suspension). The suspensions were then left under a mild stirring for a few hours and the morphological changes were followed by optical microscopy using a Nikon inverse microscope equipped with a 100× Nikon oil objective and a CoolSNAP EZ Photometrics CCD camera. Various intermediate non-equilibrium structures (see FIG. 2) were fixed by stirring the suspension at 80° C. in an open container and allowing the toluene to evaporate and the PS phase to re-solidify.

The newly shaped PS particles were isolated by washing the composite particles in ethanol to dissolve the un-polymerized TPM. The recovered PS particles were re-suspended in deionized water.

To polymerize the TPM phase 0.5 mg of 2,2'-azobis-isobutyrylnitrile (AIBN, Sigma-Aldrich) were added to the suspension and the mixture heated at 80° C. for 3 h. After the reaction the particles were cleaned by sedimentation and resuspension in pure water.

To dissolve the PS seeds and obtain colloids with cavities, the polymerized particles were first resuspended in anhydrous ethanol and then washed in pure toluene. When the PS seeds were completely dissolved the remaining TPM particles were transferred back in ethanol and finally in pure water.

Hematite cubes were chemically etched off the composite particles by adding concentrated hydrochloric acid (HCl 37% wt, Acros) directly into the particles suspension to a final HCl concentration of 5M. After typically 12 hours the hematite fully dissolved and the remaining polymer particles were washed several time in deionized water until reaching a neutral pH.

Inorganic nanoparticles were bound onto our composite colloids via amine group linkages mediated by a silane coupling agent (3-(Ethoxydimethylsilyl)propylamine, 97% Sigma-Aldrich). The coupling agent was anchored on polymerized TPM-PS particles via a condensation reaction as follows: 5 μL of 3-(Ethoxydimethylsilyl) propylamine and 5 μL of Tetramethylammonium hydroxide (TMAH, 25% in Water, Acros) were added, under stirring, to a 20 mL suspension of particles in anhydrous ethanol and let react overnight. The modified particles were washed twice in ethanol to remove unreacted silanes and then resuspended in deionized water. The inversion in the measured zeta potential from −70 mV to +30 mV (measured at neutral pH) confirmed the successful surface modification. Next, this aqueous suspension was concentrated by reducing its volume to 1 mL and then rapidly injected into a 10 mL aqueous suspension of nanoparticles. The mixture was left under stirring for 10 minutes before washing the excess of nano-particles off via sedimentation and redispersion in pure water. Gold nano-particles were prepared by reducing Au(III) ($AuCl_3$ trihydrate, 99.9% Sigma-Aldrich) using sodium borohydride ($NaBH_4$, ≥98% Sigma-Aldrich). Briefly, 1 mL of $NaBH_4$ 0.1M was rapidly added to a 20 mL $AuCl_3$ 0.1 mM solution kept under vigorous stirring. The formation of the gold sol is instantaneous and the resulting suspension was used without further purification. Magnetite ($Fe_3O_4$) nano-particles were prepared following the method described by Massart.

Poly(ethylene oxide) (PEO, Acros Organics) with a molecular weight of 600,000 was used as depletant agent to drive the particles self-assembly. Depending on the colloidal system, various concentrations of PEO were used (typically between 0.3 and 1.2 g/L). In all the experiments the ionic strength was fixed at 5 mM NaCl. The assembly experiments were performed confining the particle suspensions in sealed borosilicate glass capillary (inner dimensions 2.0×0.1 mm, Vitrocom).

Example III

Stable suspensions of fluorescently labeled TPM spheres dispersed in organic solvents are prepared. To prepare spheres with a diameter of approximately 1 μm, 150 μL of $NH_3$ 28% are added under stirring to 180 mL of water followed by 600 μL of TPM. The mixture is left under mild stirring for approximately 3 hours to allow the emulsion to form. These droplets can be further grown by slowly adding to the emulsion a solution of hydrolyzed TPM (prepared as described in Example II). When the desired particle size has been reached, the emulsion is polymerized via a radical polymerization by first adding 10 mg of 2,2'-azobis-isobutyrylnitrile (AIBN, Sigma-Aldrich) and then bringing the mixture to 80° C. for 3 hours. To prepare submicron particles, 1 mL of a solution of the surfactant Pluronics F108 (BASF) 5% wt is added to the water mixture before the addition of TPM. The concentration of surfactant can be increased to reduce the droplet size. To obtain fluorescently labeled particles a 200 mM solution is prepared of rhodamine-B-isothiocyanate dye coupled with 3-aminopropyltriethoxysilane in Dimethyl sulfoxide (DMSO). Then, 2.4 mL of this dye solution was added dropwise to the emulsion; and the emulsion was polymerized at 80° C. for 3 hours as described above. After polymerization the particles were sedimented and resuspended in deionized water. To transfer the particles in organics, the solvent was gradually changed via a series of sedimentations and redispersions steps that followed this order: pure water, 50:50 water:ethanol, pure ethanol, 50:50 ethanol:toluene, pure toluene and then a solution of 20 mM Didecyldimethylammonium bromide in toluene. To simultaneously density and index match the particle the solvent was finally replaced with a mixture of approximately 45:55 v/v toluene and trichloroethylene (TCE).

Example IV

In this example a method is described for forming articles of manufacture including colloidal particle dispersions, such as for example, optionally for selected particles like ultra-bright particles with dye molecules trapped in the particles. In a preferred embodiment the method includes, controlling colloidal size. In the above described optional embodiment, the method and article comprises forming TPM droplets with the dye molecules disposed therein before the TPM is polymerized. In the preferred embodiment the TPM particles are polymerized, and if desired selectively adjusting emulsion droplet size using particular surfactants as described below. To produce a preferred geometry, such as spherical particles, a homogenous nucleation of TPM oil is achieved in the absence of seeds. More generally, the monodispersed oil droplets can be hardened by a free radical polymerization. The size of the resulting polymerized particles can be easily varied to cover the whole colloidal range by adjusting the size of the emulsion droplets. To produce sub-micron droplets of TPM oil various conventional surfactants can be used, such as sodium dodecyl sulfate or Pluronics, which are added to control droplet size. To grow large droplets the emulsion is fed with an hydrolyzed TPM solution until the desired size has been reached. The advantage of producing solid particles from oil-in-water emulsion droplets is that after the oil polymerization step, organic molecules can be dissolved in the oil phase and then permanently trapped in the resulting solid particles. This principle, for example, enabled preparation of ultra-bright colloids by concentrating high quantities of dye molecules in the TPM oil droplets prior to polymerization.

Example V

Another method enables transfer of polymerization TPM colloids in organic solvents without loosing their colloidal stability or inducing aggregation between the particles. To this end, the particles are first gradually transferred from pure water to pure ethanol via a series of sedimentation and resuspension steps. Then, once the particles are set in anhydrous ethanol, the solvent is again gradually replaced, this time with pure toluene. Finally, 200 mM of Didecyldimethylammonium bromide (and also other candidates of ammonium bromide or chloride salts with at least one attached fairly long hydrocarbon chain) can be added to the toluene suspension to stabilize the particles. The solvent can be further changed to match the particles refractive index and density. An example of matching solvent is a mixture of approximately 45:55 v/v toluene and trichloroethylene (TCE).

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of creating shaped colloids comprising,
   providing droplets comprising an organosilica oil;
   providing solid seeds selected from the group consisting of polystyrene seeds and hematite seeds; and
   heterogenically nucleating the droplets in the presence of the solid seeds;
   polymerizing the organosilica oil; and
   deforming the polymerized organosilica oil.

2. The method of claim 1, further comprising dissolving the polymerized organosilica oil and recovering the seeds.

3. The method of claim 1, wherein the polymer seeds comprise solid polystyrene.

4. The method of claim 1, wherein the polymer seeds comprise hematite.

5. The method of claim 4, comprising removing the hematite seed by chemical etching.

6. The method of claim 1, wherein the organosilica oil is 3-methacryloxypropyl trimethoxysilane (TPM).

7. The method of claim 1, wherein deforming the organosilica oil comprises additional polymerization of the organosilica oil or removing the solid seed.

8. The method of claim 7, wherein the additional polymerization of the organosilica oil comprises radically polymerizing the droplet forming a solid resulting in composite colloids of the droplet and seed.

9. The method of claim 8, further dissolving a plurality of second polymer soluble molecules in the solid seeds prior to radical polymerization of the organosilica oil.

10. The method of claim 8, further dissolving a plurality of second polymer soluble molecules in the second polymer prior to radical polymerization of the droplet.

11. A method of creating shaped particles comprising:
solubilizing 3-methacryloxypropyl trimethoxysilane (TPM) in water by hydrolysis;
polymerizing the solubilized TPM into low molecular weight oligomers via a polycondensation reaction to form a droplet;
phase separating the oligomers to form charge-stabilized oil-in-water emulsion droplets; and
creating a cavity in the droplets by radical polymerization of acrylate moieties of the oligomers forming cross-linked silsesquioxanes.

12. The method of claim 11, further comprising the addition of polystryrene seed prior to phase separation and forming the charge-stabilized oil-in-water emulsion droplets comprises engulfing a seed in an oil phase of the droplet or trapping a seed at an interface of the oil phase and a water phase of a droplet.

13. The method of claim 12, further comprising, after forming charge-stabilized oil-in-water emulsion droplets, removing the polystyrene seed by organic solvent.

14. The method of claim 13, further comprising monitoring deformation of the seeds and removing out-of-equilibrium shapes by stripping the toluene off of the seeds.

15. A method of creating shaped particles comprising:
solubilizing an organosilica oil in water by hydrolysis;
polymerizing the solubilized organosilica into low molecular weight oligomers via a polycondensation reaction to form a droplet;
adding polystryrene seeds;
phase separating the oligomers to form charge-stabilized oil-in-water emulsion droplets encapsulating the polystyrene seeds; and
dissolving the polystyrene seed and deforming the droplet.

16. The method of claim 15, wherein the organosilica oil is 3-methacryloxypropyl trimethoxysilane (TPM).

* * * * *